United States Patent
Lange

(10) Patent No.: US 9,860,863 B2
(45) Date of Patent: Jan. 2, 2018

(54) STATIC DELAY COMPENSATION IN A TELECOMMUNICATIONS SYSTEM

(71) Applicant: COMMSCOPE TECHNOLOGIES LLC, Hickory, NC (US)

(72) Inventor: Keld Knut Lange, Oetisheim (DE)

(73) Assignee: CommScope Technologies LLC, Hickory, NC (US)

( * ) Notice: Subject to any disclaimer, the term of this patent is extended or adjusted under 35 U.S.C. 154(b) by 274 days.

(21) Appl. No.: 14/717,642

(22) Filed: May 20, 2015

(65) Prior Publication Data
US 2016/0134353 A1    May 12, 2016

Related U.S. Application Data

(60) Provisional application No. 62/076,260, filed on Nov. 6, 2014.

(51) Int. Cl.
*H04W 56/00* (2009.01)

(52) U.S. Cl.
CPC ................................ *H04W 56/004* (2013.01)

(58) Field of Classification Search
CPC . H04L 61/103; H04L 61/6022; H04W 56/004
See application file for complete search history.

(56) References Cited

U.S. PATENT DOCUMENTS

| | | | |
|---|---|---|---|
| 2007/0072646 A1 | 3/2007 | Kuwahara et al. | |
| 2007/0280159 A1 | 12/2007 | Liu et al. | |
| 2012/0201199 A1* | 8/2012 | Proctor, Jr. | H04W 52/42 370/328 |
| 2012/0327789 A1* | 12/2012 | Grenier | H04L 43/10 370/252 |
| 2013/0210490 A1* | 8/2013 | Fischer | H04W 88/08 455/561 |

FOREIGN PATENT DOCUMENTS

KR    1020110127233    11/2011

OTHER PUBLICATIONS

International Search Authority, "International Search Report", "Foreign Counterpart to U.S. Appl. No. 14/717,642", May 12, 2016, pp. 1-7, Published in: WO.

\* cited by examiner

*Primary Examiner* — Jianye Wu
(74) *Attorney, Agent, or Firm* — Fogg & Powers LLC

(57) ABSTRACT

Certain features relate to compensating for a roundtrip delay caused by a distributed antenna system. A delay unit communicatively coupled to a base station can intercept the delay compensation signaling communicated between the digital baseband unit of the base station and the radio transmitter unit of the base station. The delay unit can adjust the delay compensation signaling by adding to the delay compensation signaling the pre-determined fiber delay caused by the DAS. In some aspects, the delay unit can delay the control words for a base station operating under the Common Public Radio Interface standard. In other aspects, the delay unit can delay the roundtrip time measurement message for a base station operating under the Open Base Station Architecture Initiative standard.

20 Claims, 6 Drawing Sheets

STATIC DELAY COMPENSATION IN A TELECOMMUNICATIONS SYSTEM

CROSS-REFERENCE TO RELATED APPLICATION

This claims priority to U.S. Provisional Application Ser. No. 62/076,260, filed Nov. 6, 2014 and titled "Static Delay Compensation in a Telecommunications System," the contents of which are incorporated herein by reference.

TECHNICAL FIELD

The disclosure relates generally to telecommunications and, more particularly (although not necessarily exclusively), to configuring a telecommunications system to compensate for static delays caused by the use of a distributed antenna system.

BACKGROUND

A DAS can be used to extend wireless coverage in an area through the use of one or more head-end units and multiple remote units coupled to each head-end unit. Head-end units can be coupled to one or more base stations that can each manage wireless communications for different cell sites. A head-end unit can receive downlink signals from the base station and distribute downlink signals in analog or digital form to one or more remote units. The remote units can wirelessly transmit the downlink signals to user equipment devices within coverage areas serviced by the remote units. In the uplink direction, signals from user equipment devices may be received by the remote units. The remote units can transmit the uplink signals received from user equipment devices to the head-end unit. The head-end unit can transmit uplink signals to the serving base stations.

The use of a head-end unit and remote units to extend the wireless coverage of a base station can increase the static delay (also known as a roundtrip delay) to a user device because of additional processing time and time delays caused by the extended distance signals travel from the head-end unit to remote units in the DAS. This can impact the maximum cell range a base station can cover. The static delay in a DAS can de-synchronize user device connections and result in signal interference when connected to a base station with a limited cell range.

SUMMARY

Certain aspects and features relate to configuring a telecommunications system to compensate for static delays caused by extending wireless coverage of a base station with a distributed antenna system (DAS).

In one aspect, a system is provided. The system can include a distributed antenna system for being communicatively coupled to a base station. The distributed antenna system includes a head-end unit and one or more remote units communicatively coupled to the head-end unit. The head-end unit is configured to transmit wireless communication data in signals from the base station to the remote units. The remote units are configured to wirelessly transmit the wireless communication data to user devices. The system also includes a delay unit communicatively coupled to the base station. The delay unit is configured to introduce to the base station a delay period to control information included in a transmit frame transmitted by the base station. The delay period corresponds to a roundtrip delay caused by the distributed antenna system.

In another aspect, a method is provided. The method can include receiving an optical signal from a radio transmitter unit of a base station. The optical signal can carry a first transmit frame including control information and data information. The method can also include generating delayed control information by introducing a delay period to the control information for a duration of a roundtrip delay caused by a distributed antenna system. The method can further include generating second transmit frame by multiplexing the delayed control information and the data information. The method can also include transmitting the second transmit frame to a digital baseband unit of the base station.

In another aspect, a head-end unit is provided. The head-end unit can include a first interface configured to receive and transmit, with a radio transmitter unit of a base station, signals that include wireless communication data. The head-end unit can also include a second interface configured to transmit the wireless communication data from the radio transmitter unit of the base station to one or more remote units of a distributed antenna system. The head-end unit can also include a delay unit for being communicatively coupled to a digital baseband unit of the base station and the radio transmitter unit of the base station. The delay unit is configured to introduce to the base station a delay period corresponding to a roundtrip delay caused by the distributed antenna system by adding the delay period to control information included in a transmit frame transmitted to the base station.

DETAILED DESCRIPTION

Figure 1:
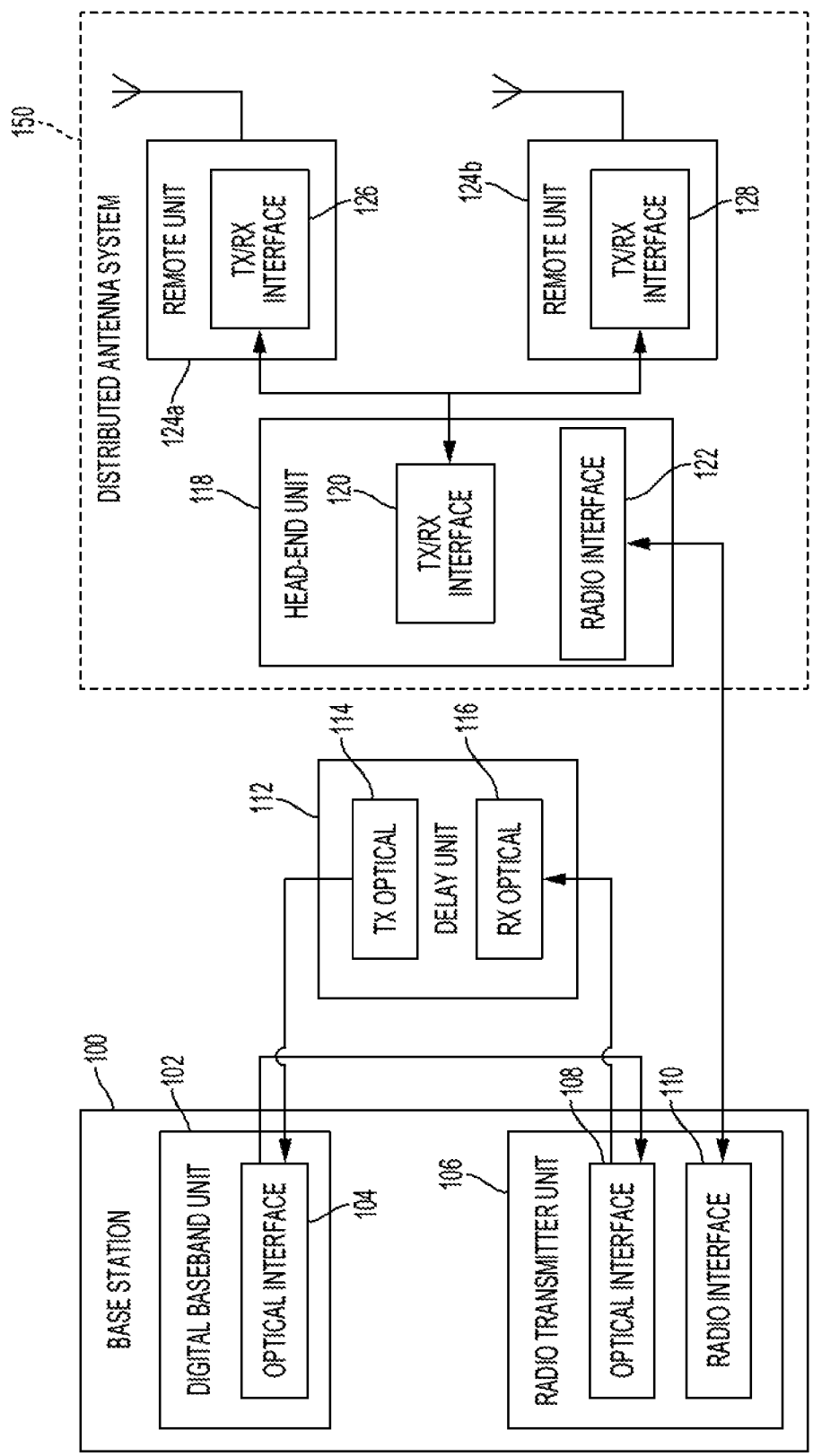
FIG. 1 is an example of a block diagram of a distributed antenna system (DAS) and a delay unit communicatively coupled to a base station according to certain aspects.

Certain aspects and features of the present disclosure relate to compensating for the roundtrip delay caused by the use of a distributed antenna system (DAS) in a telecommunications system. The roundtrip delay can be a pre-determined delay period calculated based on the configuration of the DAS. For example, the roundtrip delay can be based on the number of head-end units and remote units extending the wireless coverage of the base station and the length of the communication links between the base station and the head-end unit and between the head-end unit and the remote units. The roundtrip delay can vary over time due to configuration changes of the DAS. The roundtrip delay can include a roundtrip fiber delay based on the latency of the fiber links used in the DAS. To adjust for the roundtrip delay of the DAS, a delay unit can adjust delay compensation signaling provided between a digital baseband unit and a radio transmitter unit of the base station.

For example, the Common Public Radio Interface (CPRI) and the Open Base Station Architecture Initiative (OBSAI) are two radio interface standards that specify the physical layer of communication between the digital layer of a base station and the radio transmitter unit of the base station. The CPRI and OBSAI standards provide an automatic delay mechanism for compensation of fiber delays between the digital baseband unit of the base station and the radio transceiver unit of the base station. The digital baseband unit and the radio transceiver unit of the base station can be coupled via an optical link that can vary in length. For example, the digital baseband unit and the radio transceiver unit can be communicatively coupled with optical fiber lines 20 kilometers long. Delay compensation signaling protocols in the CPRI and OBSAI standards indicate how the digital baseband of the base station can compensate for the fiber delay between the digital baseband unit and the radio transmitter unit of the base station.

In some aspects, a delay unit can be included to intercept the delay compensation signaling between the digital baseband unit and the radio transmitter unit of the base station. The delay unit can adjust the delay compensation signaling between the digital baseband unit and the radio transmitter unit by introducing an additional delay corresponding to the roundtrip delay of the DAS. Introducing an additional delay into the base station signaling protocols allows the delay unit to compensate for the roundtrip delay of the DAS. The delay unit can compensate for the roundtrip delay by leveraging the delay compensation routines in the CPRI and OBSAI standards without requiring modification to the base station.

Compensating for the roundtrip delay caused by the DAS according to certain aspects can allow the base station as configured for a minimum cell range to operate in an additional cell range as extended by the DAS. Thus, a base station configured for a limited cell range (e.g., 5 kilometers) can be coupled to a DAS configured with a delay unit as described herein without resulting in signal interference among mobile devices or de-synchronization of mobile devices. This can help optimize the network by improving the Random Access Channel performance and improving the overall data throughput to the mobile units within the cell.

In other aspects, the head-end unit of a DAS can inform the base station of the roundtrip delay caused by the DAS. For example, a standardized interface (e.g., Antenna Interface Standards Group (AISG)) can be used to signal the base station of any roundtrip delays resulting from the use of the DAS. The base station can then compensate for the roundtrip delay, allowing for extended cell coverage via the DAS.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 is a block diagram of a DAS 150 coupled to a base station 100 according to certain aspects and features. The DAS 150 can include a network of spatially separated remote units 124a-b communicatively coupled to a head-end unit 118 for communicating with the base station 100. For example, remote units 124a-b can be coupled directly to the head-end unit 118. The remote units 124a-b can provide wireless service to user equipment devices positioned in respective coverage zones of the remote units 124a-b.

The base station 100 can include a digital baseband unit 102 and a radio transmitter unit 106. The digital baseband unit 102 and radio transmitter unit 106 can each include optical interfaces 104, 108, respectively, to communicate via various radio interface standards (e.g., CPRI or OBSAI). The digital baseband unit 102 can be configured to measure the fiber delay resulting from the optical link between the digital baseband unit 102 and the radio transmitter unit 106. For example, in the CPRI standard, the digital baseband unit 102 can measure the time difference between the internal frame start of the transmit frame from the optical interface 104 and start of the receive frame received at the optical interface 104 (from herein referred to as the fiber roundtrip delay). In the OBSAI standard, the digital baseband unit 102 can measure the fiber roundtrip delay of a round-trip time (RTT) message packet.

The head-end unit 118 can include a radio interface 122 for communicating with a radio interface 110 included in the radio transmitter unit 106 of the base station 100. The head-end unit 118 can also include a transmit/receive interface 120 for communicating wireless signals with the respective transmit/receive interfaces 126,128 in remote units 124a-b. Any suitable communication link can be used for communication between the base station 100 and head-end unit 118. For example, the radio interfaces 110, 122 can provide support for a direct connection or a wireless connection. A direct connection can include, for example, a connection via a copper, optical fiber, or other suitable communication medium. In some aspects, the head-end unit 118 can include an external repeater or internal RF transceiver to communicate with the base station 100. In some aspects, the head-end unit 118 can combine data for downlink signals received from different base stations. The head-end unit 118 can transmit the combined data for the downlink signals to one or more of the remote units 124a-b.

The remote units 124a-b can provide signal coverage to user equipment devices by transmitting data for downlink signals via a radio interface to user equipment devices and receiving data for uplink signals from user equipment devices. The remote units 124a-b can transmit data for uplink signals to the head-end unit 118. The head-end unit 118 can combine data for the uplink signals received from remote units 124a-b for transmission to the base station 100.

A delay unit 112 can be included between the optical interface 108 of the radio transmitter unit 106 and the optical interface 104 of the digital baseband unit 102 of the base station 100. Although FIG. 1 depicts an optical connection between the delay unit 112 and the radio transmitter unit 106 and digital baseband unit 102, any digital wired interface can be used. The delay unit 112 can include an optical transmit port 114 for providing signals to the optical interface 104 of the digital baseband unit 102. Similarly, the delay unit 112 can include an optical receive port 116 for receiving signals from the optical interface 108 of the radio transmitter unit 106. The delay unit 112 can effectively intercept the signals being transmitted from base station radio transmitter unit 106 to the base station digital baseband unit 102. By intercepting the optical signal, the delay unit 112 can introduce to the base station 100 delay compensation protocols a delay corresponding to the roundtrip delay of the DAS 150. The roundtrip delay of the DAS 150 can be pre-determined based on the amount of head-end units 118 and remote units in the DAS 150 and the length of the communication links between the components of the DAS 150. By adding the roundtrip delay caused by the DAS 150 to the optical signal provided from the radio transmitter unit 106 to the digital baseband unit 102, the DAS roundtrip delay will be included in the base station fiber roundtrip delay as measured in the digital baseband unit 102 of the base station 100.

The delay unit 112 can be implemented in any suitable device for digital signal processing to manipulate the signals being provided between the digital baseband unit 102 and the radio transmitter unit 106. For example, the delay unit 112 can be implemented in a microprocessor, an application-specific integrated circuit ("ASIC"), a field-programmable gate array ("FPGA"), or other suitable processor. The delay unit 112 can be implemented in one processor or any number of processors configured to execute algorithms for adjusting the delay compensation signaling of the base station 100. In aspects utilizing the CPRI radio interface standard, the delay unit 112 can be implemented via a synchronized multiplexing element and a delay line for the first $1/16^{th}$ of the frame containing the control information. The multiplexing unit and the delay line can be implemented using analog or digital aspects.

Figure 2:
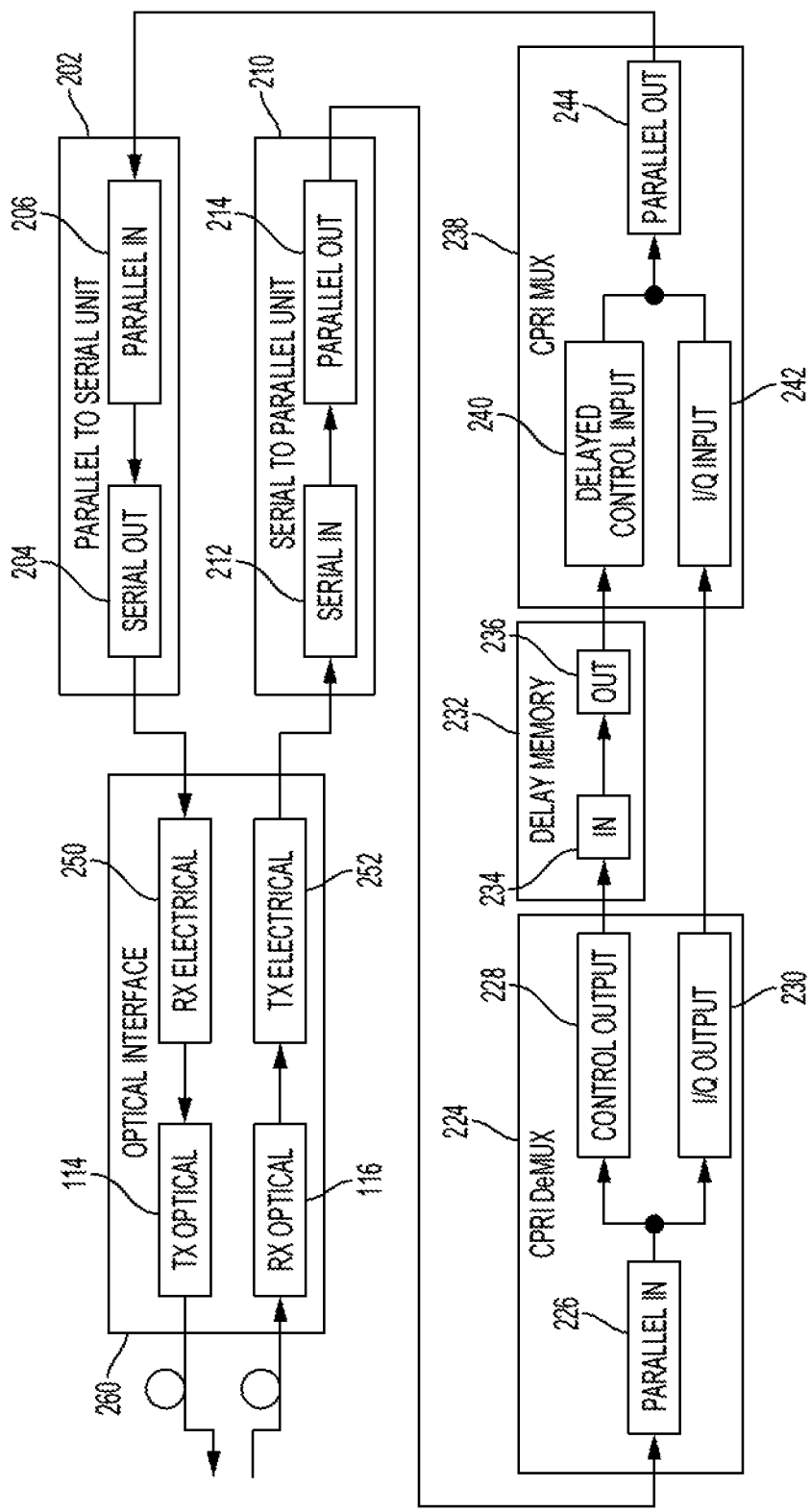
FIG. 2 is a block diagram showing an example of a delay unit configured to adjust delay compensation signaling of a base station operating under a Common Public Radio Interface (CPRI) standard according to certain aspects.

The delay unit 112 as shown in FIG. 1 can be configured to introduce a delay period into the control signaling between the radio transmitter unit 106 and the digital baseband unit 102 of the base station according to various radio interface standards. For example, FIG. 2 depicts an example of the delay unit 112 configured to inject the appropriate roundtrip delay caused by the DAS 150 for a base station 100 operating under the CPRI radio interface standard.

For a base station 100 operating under the CPRI radio interface standard, the delay unit 112 can inject the roundtrip delay of the DAS 150 by delaying the control channel of the transmit signal provided from the radio transmitter unit 106. The transmit signal from the radio transmitter unit 106 can be provided to the optical interface 108 of the delay unit 112 via the optical receive port 116. The transmit signal can include both serialized I/Q data including wireless communication and call information as well as the control data for the communication. The optical interface 260 can be a small form factor pluggable interface that includes an electrical transmit block 252 for converting received optical signals to electrical signals. The electrical signals are provided to a serial to parallel converter 210, which can convert the serial stream of I/Q and control data to a parallel output stream. The control and I/Q data stream are provided to a parallel input port 226 in a CPRI demultiplexer 224, which can separate the control information and the I/Q data into separate data streams. The CPRI demultiplexer 224 can provide the control information to a control output 228 and the I/Q data to an I/Q output 230.

The delay unit 112 can add the roundtrip delay period of the DAS 150 by delaying the control channel of the transmit signal provided from the radio transmitter unit 106. For example, the delay unit 112 can delay control frame information specifying timing information (e.g., comma byte, synchronization, and timing) and control information elements (e.g., C&M link, layer 1 inband protocol, Ctrl_Axc, and any vendor specific control information). Certain aspects can allow for introducing time delays at a granularity of 240.42 ns (corresponding to the length of a basic LTE frame). A finer granularity of delay can be achieved by introducing a short buffer (e.g., less than or equal to one base frame) for the I/Q data.

To delay the control channel of the transmit signal, the control information is provided to an input 234 in a delay memory unit 232, which can introduce the roundtrip delay period of the DAS 150. In some aspects, the delay memory unit 232 can be configured as a ring buffer (also known as a circular buffer) that can store the control information received from the radio transmitter unit 106. For example, the ring buffer can store the control byte of the CPRI transmit frame. The ring buffer can be configured such that the distance between the read pointer and the write pointer of the ring buffer corresponds to the roundtrip delay period caused by the DAS 150. In alternative aspects, the delay memory unit 232 can be configured as a First In First Out ("FIFO") memory.

Figure 3:
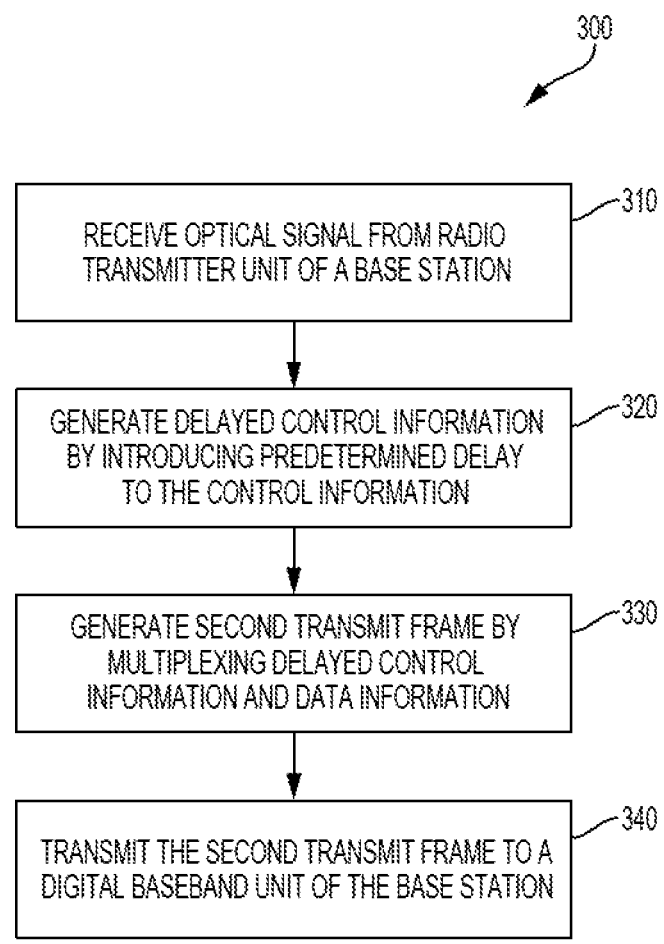
FIG. 3 is a flowchart showing an example of a process for introducing a roundtrip delay for a base station operating under the CPRI standard according to certain aspects.

The delayed control information can then be provided from a delay output 236 to a delayed control input 240 in a CPRI multiplexer 238. The I/Q data can bypass the delay memory unit 232 and can be provided to an I/Q input 242 of the CPRI multiplexer 238. The delayed control can be asynchronous and independent of I/Q data. The CPRI multiplexer can combine I/Q data and delayed control information and output the multiplexed stream as a parallel output 244 to a parallel-to-serial unit 202. The parallel-to-serial unit 202 can accept a parallel input stream 206, which includes the multiplexed delayed control information and I/Q data, and convert the parallel input stream 206 to a serial stream 204 for the optical interface. An electrical receive block 250 in the optical interface 108 can convert the serial electrical stream carrying the delayed control information and I/Q data to an optical signal for transmission to the digital baseband unit 102 via the optical transmit port 114. By delaying the control information in the optical link between the radio transmitter unit 106 and the digital baseband unit 102, the delay unit 112 can leverage the delay compensation signaling protocols that are part of the CPRI interface standard. FIG. 3 is a flowchart depicting an example process 300 for introducing the roundtrip delay in the optical link between the radio transmitter unit 106 and the digital baseband unit 102.

In block 310, delay unit 112 can receive optical signals carrying I/Q data and control information from the radio transmitter unit 106 of base station 100. For example, In the CPRI standard, a single word of a transmit frame in an optical signal from the radio transmitter unit 106 can be dedicated to control information and the remaining words of the transmit frame dedicated to I/Q data. For a 614 Mbps bit rate, the single word control information can be made up of a single byte of information. For a 1228 Mbps bit rate, the single word control information can be made up of two bytes. The remaining bytes of the transmit frame can be dedicated to I/Q data.

The delay unit 112 can generate delayed control information by introducing a delay period to the control information part of the CPRI transmit frame, as shown in block 320. The delay period can correspond to the known roundtrip delay caused by the DAS 150. The roundtrip delay can be proportional to the number of head-end units and remote units in the DAS 150 and the length of the communication links separating the head-end units and remote units in the DAS 150. Various aspects of introducing the delay are possible. For example, the control information can be stored in a ring buffer data structure included in the delay unit 112, where the distance between the read pointer and the write pointer of the ring buffer is equivalent to the amount of roundtrip delay in the DAS. For example, the control information can be transmitted at a fixed rate. In the CPRI radio interface standard, the control information can be transmitted at a chip rate of 3.84 MHz. The pointer distance between the read pointer and the write pointer divided by the 3.84 MHz chip rate can correspond to the delay period for the control information. Alternatively, a First In First Out ("FIFO") memory can be used. A simple FIFO can, for example, include a cascading set of register stages. At each clock signal, data stored in the each register stage moves to the next register stage in the set. The last register stage in the set is provided as an output word. To implement a FIFO memory as a delay buffer, at startup, the empty FIFO registers can be filled with the amount of delayed control information before the first word is read at the output.

In block 330, the delay unit 112 can generate a second transmit frame by multiplexing the delayed control information and the I/Q data information. For example, CPRI multiplexer 238 can multiplex the delayed control information and the I/Q data as a parallel output to a parallel-to-serial unit 202. The parallel-to-serial unit 202 can serialize the delayed control information and the I/Q data of the transmit frame. Once the delay unit 112 generates a second transmit frame that includes the delayed control information, the delay unit 112 can transmit the second transmit frame to the digital baseband unit 102 of the base station 100, as shown in block 340. The delay unit 112 can provide the second transmit frame to the digital baseband unit 102 via the optical transmit port 114.

Figure 4:
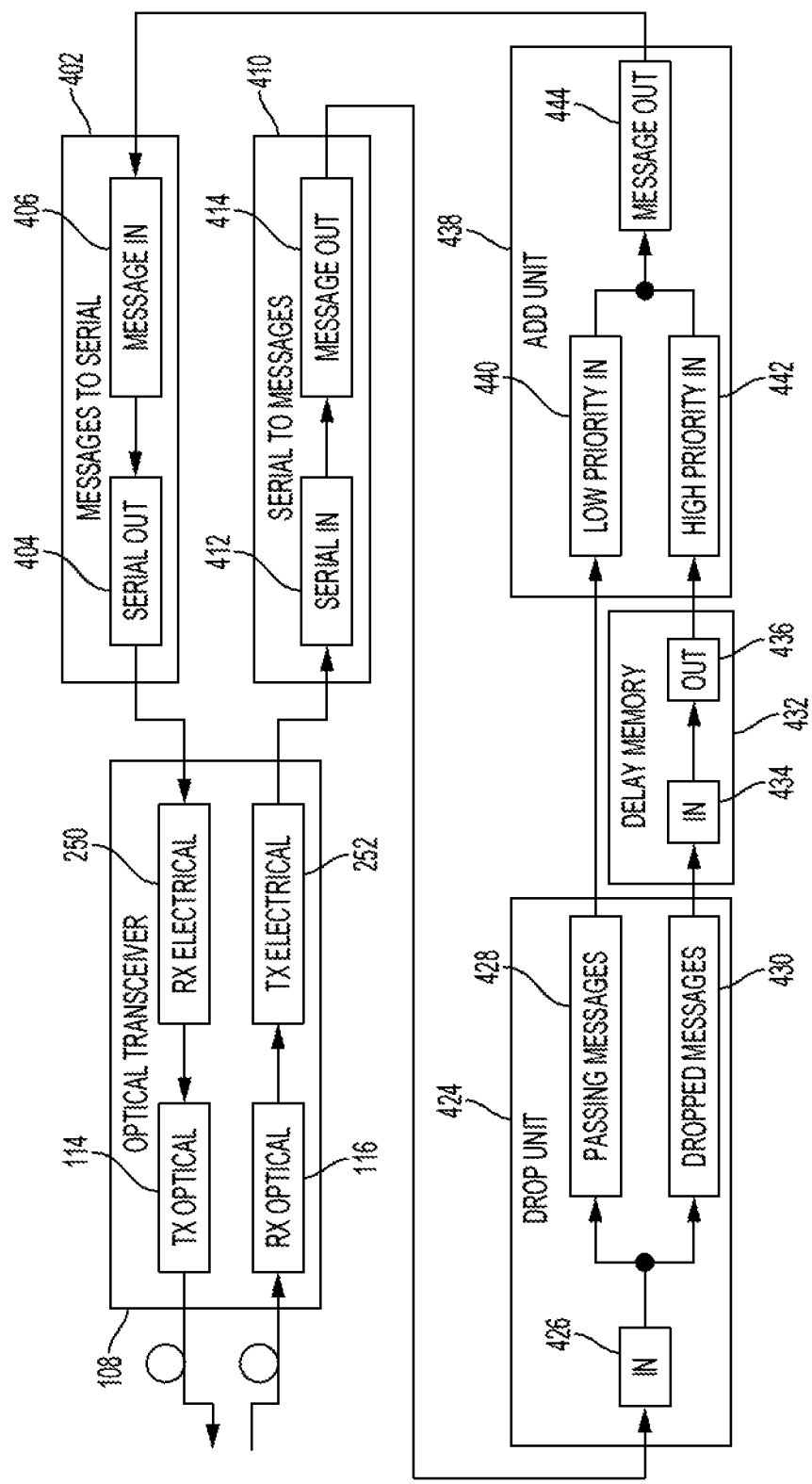
FIG. 4 depicts a block diagram showing an example of a delay unit to adjust delay compensation signaling of a base station operating under an Open Base Station Architecture Initiative (OBSAI) standard according to certain aspects.
Figure 5:
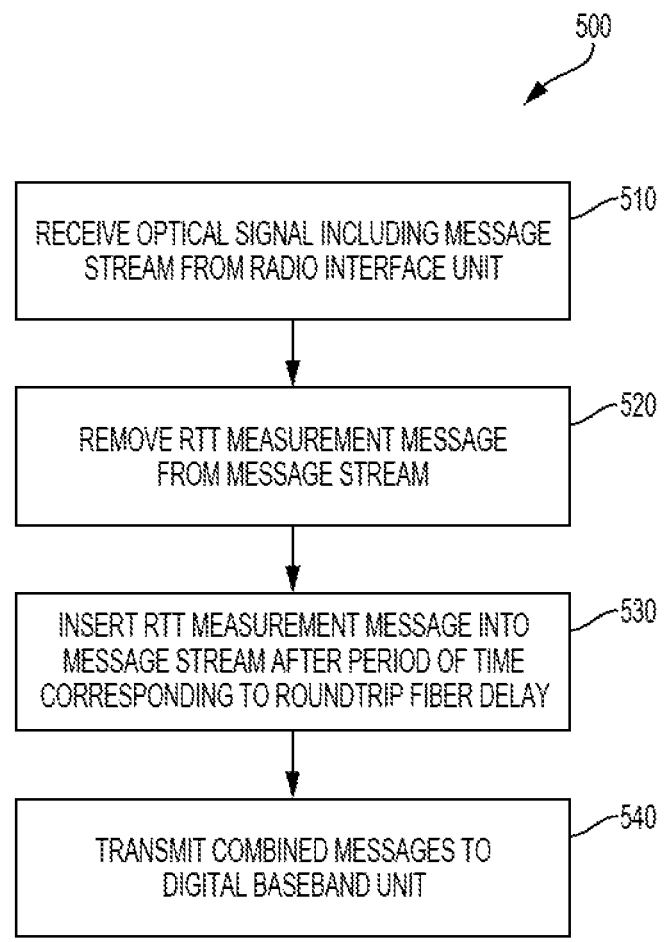
FIG. 5 depicts a flowchart showing an example of a process for adjusting delay compensation signaling for a base station operating under the OBSAI standard according to certain aspects.

While FIGS. 2-3 depict a delay unit 112 and a process 300 for adjusting the delay compensation signaling of a base station 100 operating under the CPRI radio interface standard, FIGS. 4-5 depict a delay unit 112 and a process 500 for adjusting delay compensation signaling for a base station 100 operating under the OBSAI radio interface standard. FIG. 4 depicts, for example, the delay unit 112 configured for adjusting delay compensation signaling between a radio transmitter unit 106 and the digital baseband unit 102 under the OBSAI standard.

In the OBSAI standard, the digital baseband unit 102 can send an RTT measurement message to the radio transmitter unit 106 in order to measure the base station fiber roundtrip delay. The radio transmitter unit 106 can respond by sending the RTT measurement message back to the digital baseband unit 102 after adding the measured buffering time of the radio transmitter unit 106 to the RTT measurement message. To compensate for the DAS roundtrip delay in a network utilizing the OBSAI standard, the delay unit 112 can delay the RTT measurement message as it is communicated from the radio transmitter unit 106 to the digital baseband unit 102.

For example, to compensate for the DAS roundtrip delay, the delay unit 112 can include an optical receive port 116 for receiving a serial stream of information provided from the radio transmitter unit 106. The serial stream of information received from the radio transmitter unit 106 can include RTT measurement message, other control messages, and messages carrying I/Q data. Messages transmitted according to the OBSAI standard can also be referred to as packets. An electrical transmit block 252 can convert the serial stream of messages to electrical signals, which can then be provided to a serial input 412 in serial-to-messages unit 410.

Serial-to-messages unit 410 can the convert the serial stream of information to data bytes of information, organized into discrete messages. The messages (including the RTT measurement message, other control messages, and messages carrying I/Q data) are sent out through a message output 414 to an input 426 in drop unit 424. The drop unit 424 can drop the RTT measurement message from the message stream. Remaining passing messages 428 (e.g., messages that are not dropped from the stream) include messages carrying I/Q data and other control information. The passing messages 428 can be provided to a low priority input 440 in an addition unit 438.

The dropped messages 430 (e.g., the RTT measurement messages) can be provided to an input 434 of a delay memory 432. After the roundtrip delay period caused by the DAS 150, the delay memory 432 can insert the dropped RTT measurement message into the data stream. By deleting the RTT measurement message from the original transmit stream provided by the radio transmitter unit 106 and then inserting it after a period of time corresponding to the roundtrip delay, the delay unit 112 can effectively adjust the delay compensation signaling of the OBSAI interface by delaying the RTT measurement message. The dropped messages 430 can be provided to a high priority input 442 in the addition unit 438.

The RTT measurement message includes a value indicating a time stamp indicating when the RTT measurement message was transmitted from the digital baseband unit 102. At the radio transmitter unit 106, the RTT measurement message is modified to account for any time varying buffering delay of the radio transmitter unit 106 (e.g., delay caused from additional messages being present in the output queue of the radio transmitter unit 106). In order to account for the roundtrip delay of the DAS 150, the addition unit 438 can further modify the time stamp in the RTT measurement message.

After modifying the time stamp of the RTT measurement message, the addition unit 438 can insert the modified RTT measurement message into the data stream carrying other control message and I/Q messages, which were provided to the low priority input 440. The combined message output 444 can be provided to a messages input 406 of a messages-to-serial converter 402. The messages-to-serial converter 402 can convert the delayed RTT measurement message, messages carrying I/Q data, and other control information to a serialized output stream 404. The serialized output stream 404 can be provided to an electrical receive block 250 in the optical interface. The electrical receive block 250 can convert serialized output stream 404 (including the delayed RTT measurement messages, messages carrying I/Q data, and other control information) to an optical signal for transmission to the digital baseband unit 102 via the optical transmit port 114. By delaying the RTT measurement message transmitted between the radio transmitter unit 106 and the digital baseband unit 102, the delay unit 112 can leverage the delay compensation signaling protocols that are part of the OBSAI interface standard.

FIG. 5 depicts a process 500 for adjusting delay compensation signaling for a base station 100 operating under the OBSAI radio interface standard. In block 510, the delay unit 112 can receive an optical signal that includes a message stream from a radio transmitter unit 106. The message stream (or packet stream) can include an RTT measurement message that is part of the delay compensation signaling of the OBSAI radio interface standard. The message stream can also include messages providing I/Q data (e.g., voice and data signals for an ongoing communication with a mobile device) as well as messages providing other control information.

The delay unit 112 can remove the RTT measurement messages from the message stream, as shown in block 520. For example, the delay unit 112 can include a drop unit 424 that removes the RTT measurement messages from the message stream. In block 530, the delay memory 432 can insert the removed RTT measurement message back into the message stream after a period of time corresponding to the DAS round trip fiber delay. As the RTT measurement message is inserted after completion of low priority messages (data messages and other control messages) an addition unit 438 can modify the time stamp of the RTT measurement message to account for the delayed time of the RTT measurement message. The addition unit 438 can also combine the delayed RTT measurement messages with the data messages and other control messages. The combined messages can be serialized and then transmitted to the digital baseband unit 102, as shown in block 540. By delaying the RTT measurement messages and modifying the time stamp of the RTT measurement messages to account for the DAS roundtrip delay, the delay unit 112 can leverage the delay compensation routines of the OBSAI radio interface standard that automatically configure for fiber delays between the digital baseband unit 102 and the radio transmitter unit 106.

Figure 6:
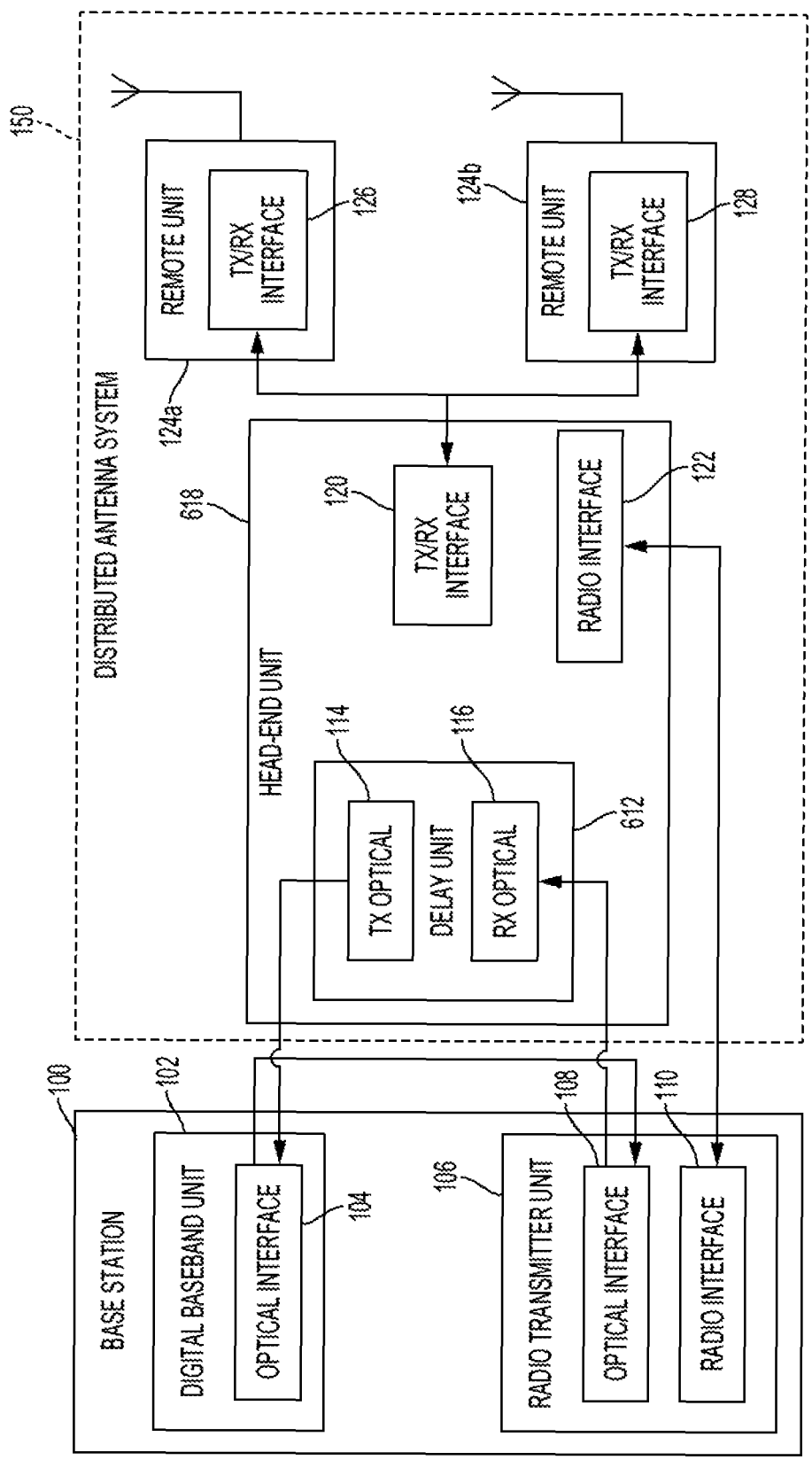
FIG. 6 is a block diagram depicting an example of a base station communicatively coupled to a distributed antenna system that includes a delay unit according to certain aspects.

Although the above examples refer to the delay unit 112 as separate from the DAS 150 for illustrative purposes, the delay unit 112 can be included within the head-end unit 118 in other aspects. FIG. 6 depicts an example block diagram of a base station 100 communicatively coupled to a DAS 150 configured to adjust the delay compensation signaling of the base station 100 to account for the roundtrip delay caused by the DAS 150. Similar to FIG. 1, the base station 100 can include a digital baseband unit 102 with an optical interface 104 and a radio transmitter unit 106 with an optical interface 108 and a radio interface 110. The base station 100, digital baseband unit 102, optical interface 104, radio transmitter unit 106, optical interface 108, and radio interface 110 can operate similar to the same named components discussed with respect to FIG. 1. Similar to FIG. 1, the DAS 150 can include a head-end unit 618, a transmit/receive interface 120, and a radio interface 122. The head-end unit 618 transmit/receive interface 120 and radio interface 122 can operate similar to the same named components discussed with respect to FIG. 1. As in FIG. 1, the head-end unit 618 can be communicatively coupled with remote units 124a-b via transmit/receive interface 126, 128, respectively. The remote units 124a-b and transmit/receive interfaces 126,128 can operate similar to the same named components discussed with respect to FIG. 1.

The head-end unit 618 can also include a delay unit 612, which can include an optical transmit port 114 and an optical receive port 116 for intercepting the delay compensation signaling between the digital baseband unit 102 and the radio transmitter unit 106. The delay unit 612 can operate similar to the delay unit 112 discussed with respect to FIGS. 1-5 above.

The foregoing description of the examples, including illustrated examples, of the subject matter has been presented only for the purpose of illustration and description and is not intended to be exhaustive or to limit the subject matter to the precise forms disclosed. Numerous modifications, adaptations, and uses thereof can be apparent to those skilled in the art without departing from the scope of this subject matter. The illustrative examples described above are given to introduce the reader to the general subject matter discussed here and are not intended to limit the scope of the disclosed concepts.

What is claimed is:

1. A system comprising:
a distributed antenna system for being communicatively coupled to a base station, the distributed antenna system including a head-end unit and one or more remote units communicatively coupled to the head-end unit, the head-end unit being configured to transmit wireless communication data in signals from the base station to the one or more remote units that are configured to wirelessly transmit the wireless communication data to user devices; and
a delay unit communicatively coupled to the base station, the delay unit being configured to introduce, to the base station, a delay period for control information included in a transmit frame processed by the base station, the delay period corresponding to an increase in a roundtrip delay between the base station and the user devices caused by the distributed antenna system.

2. The system of claim 1, wherein the delay unit is configured to add the delay period to the control information by delaying a control byte of a Common Public Radio Interface transmit frame for a duration of the increase in the roundtrip delay caused by the distributed antenna system.

3. The system of claim 2, wherein the duration of the delay period includes a time period between a transmission of an internal frame start of the transmit frame transmitted from a digital baseband unit of the base station and a receipt of a receive frame start received at the digital baseband unit of the base station.

4. The system of claim 3, wherein the delay unit includes a ring buffer including a read pointer and a write pointer, the ring buffer being configured to store the control byte of the Common Public Radio Interface Transmit frame,
wherein a distance between the read pointer and the write pointer corresponds to the delay period.

5. The system of claim 1, wherein the delay unit is configured to add the delay period to the control information by deleting a round-trip time measurement message from an Open Base Station Architecture Initiative transmit signal and inserting the round-trip time measurement message after a duration of the increase in the roundtrip delay caused by the distributed antenna system.

6. The system of claim 1, wherein the distributed antenna system is configured so that the increase in the roundtrip delay is proportional to a length of a communication link between the head-end unit and the one or more remote units.

7. The system of claim 1, wherein the control information included in the transmit frame is part of delay compensation signaling between a digital baseband unit of the base station and a radio transmitter unit of the base station.

8. A method, comprising:
receiving an optical signal from a radio transmitter unit of a base station, the optical signal including a first transmit frame including control information and data information;
generating delayed control information from the control information included in the first transmit frame based on a delay period corresponding to a duration of an increase in a roundtrip delay between the base station and user devices caused by a distributed antenna system communicatively coupled to the base station;
generating second transmit frame by multiplexing the delayed control information and the data information; and
transmitting the second transmit frame to a digital baseband unit of the base station.

9. The method of claim 8, wherein generating the delayed control information comprises delaying a control byte of a Common Public Radio Interface transmit frame for the duration of the increase in the roundtrip delay caused by the distributed antenna system.

10. The method of claim 8, wherein generating the delayed control information comprises delaying a roundtrip time measurement message for an Open Base Station Architecture Initiative transmit signal and inserting the round-trip time measurement message after the duration of increase in the roundtrip delay caused by the distributed antenna system.

11. The method of claim 9, wherein the duration of an increase in the roundtrip delay includes a time period between a transmission of an internal frame start of a transmit frame transmitted from the digital baseband unit of the base station and a receipt of a receive frame start received at the digital baseband unit of the base station.

12. The method of claim 8, wherein the increase in the roundtrip delay caused by the distributed antenna system is proportional to a length of a communication link between a head-end unit and one or more remote units of the distributed antenna system.

13. The method of claim 12, wherein the head-end unit is configured to provide wireless communication signals from the base station to the one or more remote units and the one or more remote units are configured to provide the wireless communication signals to the user devices.

14. A head-end unit, comprising:
- a first interface configured to receive and transmit, with a radio transmitter unit of a base station, signals that include wireless communication data;
- a second interface configured to transmit the wireless communication data from the radio transmitter unit of the base station to one or more remote units of a distributed antenna system; and
- a delay unit for being communicatively coupled to a digital baseband unit of the base station and the radio transmitter unit of the base station, the delay unit being configured to introduce, to the base station, a delay period corresponding to an increase in a roundtrip delay between the base station and a user device caused by the distributed antenna system by adding the delay period to control information included in a transmit frame processed by the base station.

15. The head-end unit of claim 14, wherein the delay unit is configured to add the delay period to the control information by delaying a control byte of a Common Public Radio Interface transmit frame for a duration of the increase in the roundtrip delay caused by the distributed antenna system.

16. The head-end unit of claim 15, wherein the delay period includes a time period between a transmission of an internal frame start of a transmit frame transmitted from the digital baseband unit of the base station and a receipt of a receive frame start received at the digital baseband unit of the base station.

17. The head-end unit of claim 16, wherein the delay unit includes a ring buffer including a read pointer and a write pointer, the ring buffer configured to store the control byte of the Common Public Radio Interface Transmit frame, and wherein a distance between the read pointer and the write pointer corresponds to the delay period.

18. The head-end unit of claim 14, wherein the delay unit is configured to add the delay period to the control information by deleting a round-trip time measurement message from an Open Base Station Architecture Initiative transmit signal and inserting the round-trip time measurement message after a duration of the increase in the roundtrip delay caused by the distributed antenna system.

19. The head-end unit of claim 14, wherein the increase in the roundtrip delay caused by the distributed antenna system is proportional to a length of a communication link between the head-end unit and the one or more remote units.

20. The head-end unit of claim 14, wherein the control information included in the transmit frame is part of delay compensation signaling between the digital baseband unit of the base station and the radio transmitter unit of the base station.

* * * * *